US006837395B2

(12) United States Patent
Windorski et al.

(10) Patent No.: US 6,837,395 B2
(45) Date of Patent: Jan. 4, 2005

(54) SHEET DISPENSERS AND METHODS OF MAKING AND USING THE SAME

(75) Inventors: David C. Windorski, Woodbury, MN (US); Stephen L. Gamradt, Cottage Grove, MN (US); Martin A. Kenner, Burnsville, MN (US); Michael E. Hamerly, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 17 days.

(21) Appl. No.: 10/301,909

(22) Filed: Nov. 22, 2002

(65) Prior Publication Data

US 2004/0099678 A1 May 27, 2004

(51) Int. Cl.$^7$ .............................................. B65G 59/00

(52) U.S. Cl. .............................................. 221/1; 221/2

(58) Field of Search ............................ 221/2, 7, 13, 9, 221/21, 259, 33, 45, 56, 48, 63; 271/34, 35, 149

(56) References Cited

U.S. PATENT DOCUMENTS 4,487,801 A 12/1984 Turnbull et al.
4,493,869 A 1/1985 Sweeny et al.
4,720,413 A 1/1988 Horiguchi et al.
4,720,417 A 1/1988 Sweeny et al.
4,770,320 A 9/1988 Miles et al.
4,796,781 A 1/1989 Windorski
4,889,755 A 12/1989 Charbonneau
4,907,825 A 3/1990 Miles et al.
4,925,517 A 5/1990 Charbonneau et al.
5,039,243 A 8/1991 O'Brien
5,167,346 A 12/1992 Bodziak
5,332,265 A 7/1994 Groess et al.
5,366,776 A 11/1994 Mertens
5,385,230 A 1/1995 Nygard et al.
5,391,374 A 2/1995 Charbonneau et al.
5,397,117 A 3/1995 Mertens
5,411,168 A 5/1995 Mertens et al.
5,526,955 A 6/1996 Windorski et al.
5,551,595 A 9/1996 Mertens et al.
5,671,866 A 9/1997 Bodziak
5,697,518 A 12/1997 Callahan, Jr.
5,755,356 A 5/1998 Bastiaens et al.
5,769,270 A 6/1998 Fujisawa et al.
5,904,283 A 5/1999 Kanbar
6,029,971 A * 2/2000 Lynch et al. .................. 271/34
6,068,138 A 5/2000 Carlson et al.

* cited by examiner

*Primary Examiner*—Kenneth Noland
(74) *Attorney, Agent, or Firm*—George W. Jones

(57) ABSTRACT

Sheet dispensers, which provide feedback to a user or provide a unique function to a user, are disclosed. Visual, audio, aromatic, or other types of feedback may be provided to a user by the sheet dispenser. Sheet dispensers suitable for use as a switch, a room deodorizer, a flame-generating device, or a combination thereof are disclosed. A method of activating a switch-controlled object is also disclosed. Further, a method of making sheet dispensers is also disclosed.

22 Claims, 6 Drawing Sheets

SHEET DISPENSERS AND METHODS OF MAKING AND USING THE SAME

FIELD OF THE INVENTION

The present invention is directed to sheet dispensers and uses for sheet dispensers. The present invention is further directed to methods of making sheet dispensers and applications using sheet dispensers.

BACKGROUND OF THE INVENTION

Sheet dispensers are known in the art. Various sheet dispensers are disclosed in U.S. Pat. No. 4,770,320 issued to Miles et al., U.S. Pat. No. 5,411,168 issued to Mertens et al., U.S. Pat. No. 5,551,595 issued to Mertens et al., and U.S. Pat. No. 5,755,356 issued to Bastiaens et al., all of which are assigned to 3M Innovative Properties Company (St. Paul, Minn.), and all of which are herein incorporated by reference. Known sheet dispensers provide sheets or flags, such as Post-it® notes or flags, to a user.

The present invention is directed to new sheet dispensers, which provide sheets to a user, but also provide one or more additional features.

SUMMARY OF THE INVENTION

The present invention is directed to new sheet dispensers, which provide one or more types of feedback to a user and/or one or more unique functions. The sheet dispensers of the present invention provide one or more types of feedback and/or functions due to the movement of a stack of sheets within the sheet dispenser. As a user removes a sheet from the sheet dispenser, the stack of sheets moves from a first location to a second location within the sheet dispenser. This movement of the stack of sheets either directly or indirectly provides feedback to a user and/or some event to take place. Examples of feedback include, but are not limited to, visual feedback, audio feedback, aromatic feedback, or a combination thereof. Exemplary events include, but are not limited to, associating data with a given sheet removed from the sheet dispenser.

In one exemplary embodiment of the present invention, the sheet dispensers provide visual feedback to a user, wherein the visual feedback is indicia, which is at least partially blocked from view by the stack of sheets. As the stack of sheets moves from a first location to a second location within the sheet dispenser, the indicia becomes viewable to a user. The indicia may be any indicia including, but not limited to, printed text, handwritten text, artwork, etc. The sheet dispenser may be utilized as an advertising media by providing visual feedback to a user in the form of a company logo or slogan. In addition, the advertising sheet dispenser may also provide audio feedback in the form of sound alone or in combination with visual advertising feedback. For example, the sheet dispenser may provide visual feedback in the form of a company name or logo, as well as, audio feedback in the form of a company slogan or theme song.

In other exemplary embodiments of the present invention, the sheet dispensers provide one or more unique functions resulting in the occurrence of an event. For example, the sheet dispenser may act as a switch to turn “on” or “off” a switch-activated device, such as a lamp, a sound system or an alarm clock. In this embodiment, as the stack of sheets moves from a first location to a second location within the sheet dispenser, the movement of the stack of sheets causes a signal (or electrical current) to be sent to a signal-receiving device (or switch-activated device).

The sheet dispensers of the present invention may also function as a room deodorizer providing aromatic feedback, such as a desirable scent. In this embodiment, removal of an individual sheet may produce the aromatic feedback. Alternatively, movement of the stack of sheets from a first location to a second location within the sheet dispenser may cause a signal (or electrical current) to be sent to a scent-generating device, which produces the aromatic feedback.

In yet a further embodiment of the present invention, the sheet dispensers provide a flame for use as a match or other fire-starting device. In this embodiment, removal of an individual sheet may produce the flame. Alternatively, movement of the stack of sheets from a first location to a second location within the sheet dispenser may cause a signal (or electrical current) to be sent to a fire-starting device, which produces the flame.

The present invention is also directed to methods of using the new sheet dispensers, and systems containing at least one sheet dispenser of the present invention. The sheet dispensers of the present invention may be used in an office or home environment to provide one or more types of feedback to a user and/or one or more unique functions. As discussed above, the sheet dispensers of the present invention may be used as a switch for activating a switch-activatable device. The sheet dispensers may cooperate with a signal-receiving device, such as a personal computer, for associating data with a given sheet removed from the sheet dispenser. Other applications include, but are not limited to, use as an advertising media, use as a room deodorizer, use as a flame-generating device, and combinations thereof.

The present invention is further directed to methods of making sheet dispensers, which provide one or more types of feedback and/or functions as described above.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to a variety of sheet dispensers, each of which provides (i) feedback to a user, and/or (ii) one or more unique functions in addition to dispensing sheets. In one exemplary embodiment of the present invention, the sheet dispenser may be used as an advertising medium, providing visual and/or audio feedback to a user. In a second exemplary embodiment of the present invention, the sheet dispenser provides a unique function by operating as a switch, generating a signal to be received by one or more switch-activated devices. In a third exemplary embodiment of the present invention, the sheet dispenser may provide aromatic feedback by operating as a room deodorizer, wherein (i) the act of removing a sheet from the sheet dispenser or (ii) the movement of the stack of sheets within the sheet dispenser creates a desirable scent for a user. In a fourth exemplary embodiment of the present invention, the sheet dispenser may provide aromatic feedback, as well as, provide a unique function by generating a flame to provide heat and/or light to a user, wherein (i) the act of removing a sheet from the sheet dispenser or (ii) the movement of the stack of sheets within the sheet dispenser creates the flame.

The present invention is further directed to a variety of applications using the sheet dispensers alone or in combination with additional signal-receiving devices and/or switch-activatable devices. The present invention is further directed to a method of activating a switch, wherein the method comprises a step of at least partially removing a sheet from a sheet dispenser.

The sheet dispensers of the present invention may have a size and shape similar to conventional sheet dispensers as disclosed in U.S. Pat. No. 4,770,320 issued to Miles et al., U.S. Pat. No. 5,411,168 issued to Mertens et al., U.S. Pat. No. 5,551,595 issued to Mertens et al., and U.S. Pat. No. 5,755,356 issued to Bastiaens et al., all of which are assigned to 3M Innovative Properties Company (St. Paul, Minn.), and all of which are herein incorporated by reference. A description of exemplary sheet dispensers of the present invention, methods of making sheet dispensers, and uses is given below.

I. Sheet Dispenser Components

Sheet dispensers of the present invention comprise one or more components as described below.

A. Housing

Figure 1:
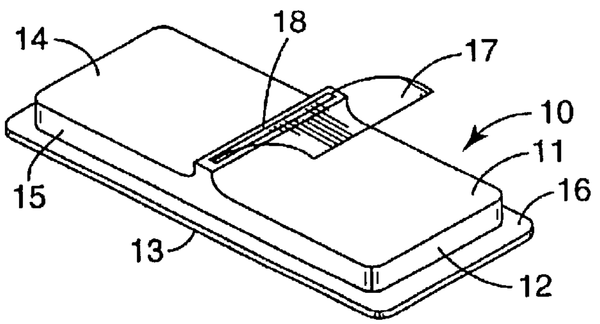
FIG. 1 depicts an exemplary sheet dispenser of the present invention.

An exemplary sheet dispenser is shown in FIG. 1. Sheet dispenser 10 comprises housing 11 having an upper housing portion 12 attached to a lower housing portion 13. Upper housing portion 12 has an upper surface 14 and side walls 15, which provide a housing height, $h_h$, suitable for containing a stack of sheets. Upper housing portion 12 may be temporarily or permanently attached to lower housing portion 13 along perimeter 16. As shown in FIG. 1, sheet tab portion 17 extends from sheet dispenser 10 through slot 18 in upper housing portion 12.

The exemplary sheet dispenser as shown in FIG. 1 has a rectangular shape and is suitable for dispensing rectangular sheets or tags. It should be noted that the sheet dispensers and sheets of the present invention may have any other shape. Suitable shapes include, but are not limited to, rectangular, square, circular, oblong, rhombus, trapezoidal, barbell, diamond, or any other shape. Further, the sheet dispenser of FIG. 1 is described as having two separate components forming housing 11. It should be noted that sheet dispenser 10 may comprise a single component having an opening therein for inputting a new stack of sheets (not shown).

Housing 11 of sheet dispenser 10 may comprise a variety of materials including, but not limited to, plastic, paper, glass, metal, or a combination thereof. Desirably, housing 11 is formed from a moldable plastic material. In one embodiment of the present invention, upper housing portion 12 comprises a molded plastic material and lower housing portion 13 comprises a paper substrate. In some cases, it is desirable for the upper housing portion 12 and/or the lower housing portion 13 to be formed from a transparent material so that a user can visually inspect the interior of sheet dispenser 10 enclosed by upper housing portion 12 and lower housing portion 13.

In a further embodiment of the present invention, the sheet dispenser comprises a transparent upper housing portion 12 and a lower housing portion 13, wherein an upper surface of lower housing portion 13 is coatable or printable.

Printed messages, slogans, symbols, handwritten notes, or any other indicia may be adhered to, coated, printed, or written onto the upper surface of lower housing portion 13 as described below with reference to FIGS. 12-14.

Although not required, upper housing portion 12 and/or lower housing portion 13 may further comprise stack restrictors (not shown) along one or more interior edges of upper housing portion 12 and/or lower housing portion 13. The stack restrictors restrict the movement of the stack of sheets within housing 11 so that the stack of sheets moves in a single, straight shuttle pathway between a first position and a second position within sheet dispenser with substantially no movement perpendicular to the single shuttle pathway.

B. Stack of Sheets

The sheet dispensers of the present invention further comprise a stack of sheets positioned within housing 11 of sheet dispenser 10. The stack of sheets comprises one or more sheets releasably attached to one another to form a stack. An exemplary individual sheet suitable for use in the stack of sheets is shown in FIG. 2.

Figure 2:
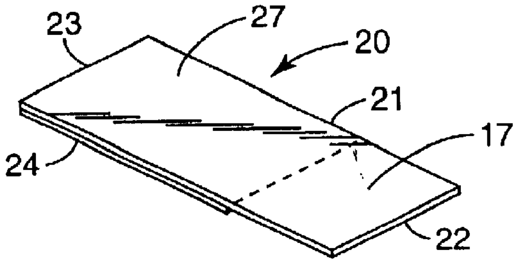
FIG. 2 depicts an exemplary individual sheet, which may be combined with other similar sheets to form a stack of sheets for use in the sheet dispensers of the present invention.

As shown in FIG. 2, individual sheet 20 comprises a single rectangular layer 21 of a sheet-forming material. Suitable sheet-forming materials include, but are not limited to, polymeric materials, papers, films, metal foils, and combinations thereof. Desirably, rectangular layer 21 comprises a transparent flexible polymeric material such as polyester, polypropylene or cellulose acetate. Rectangular layer 21 has opposite major side surfaces and opposite first and second ends 22 and 23. Desirably, at least a portion of a lower surface of rectangular layer 21 is coated with an adhesive coating 24, more desirably a pressure sensitive adhesive coating. As shown in FIG. 2, end portion 27 is coated with adhesive coating 24. Tab portion 17 of rectangular layer 21 is typically free of adhesive on both of the side surfaces along end portion 17 and adjacent first end 22. Tab portion 17 is typically smaller in area than second end portion 27 and may be printed with a bright colored ink (e.g., red, green or yellow) to make tab portion 17 visually distinguishable.

Figure 3A:
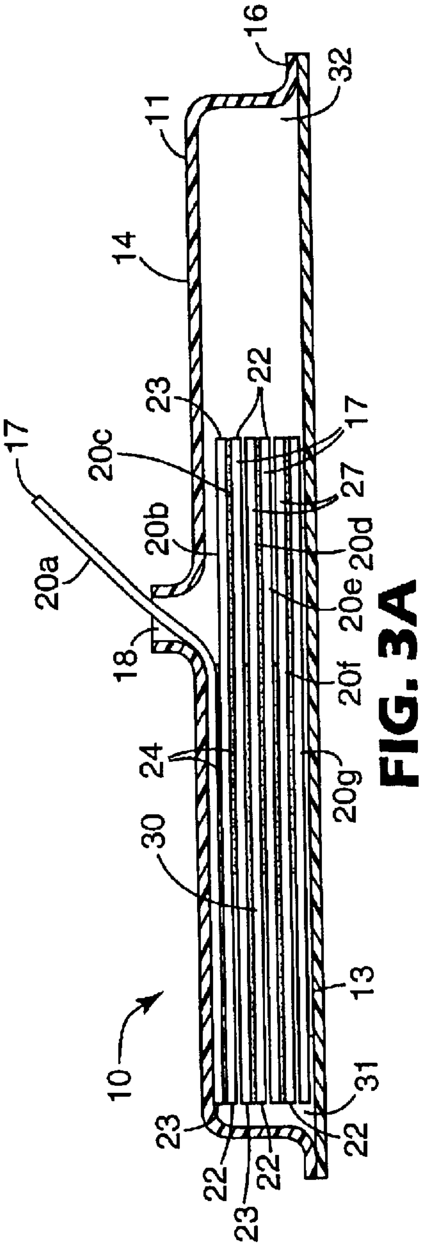
FIG. 3A depicts an enlarged sectional side view of an exemplary sheet dispenser of the present invention having a stack of sheets in a first position with a first sheet within the stack extending through a slot in the sheet dispenser.

One or more individual sheets 20 may be combined to form a stack of sheets suitable for use in the sheet dispenser of the present invention. FIG. 3A depicts a cross-sectional view of sheet dispenser 10 having a stack of sheets 30 positioned within housing 11 of sheet dispenser 10. As shown in FIG. 3A, stack of sheets 30 comprises seven individual sheets referred to herein as sheets 20*a* to 20*g*. As a user removes individual sheet 20*a* from sheet dispenser 10, stack 30 moves from a first position 31 towards a second position 32 within sheet dispenser 10. This shuttling motion is fully described in U.S. Pat. No. 4,770,320 issued to Miles et al. (the '320 patent), the disclosure of which is incorporated herein by reference in its entirety. In addition, FIGS. 3B to 3D further describe the shuttling motion below.

Figure 3B:
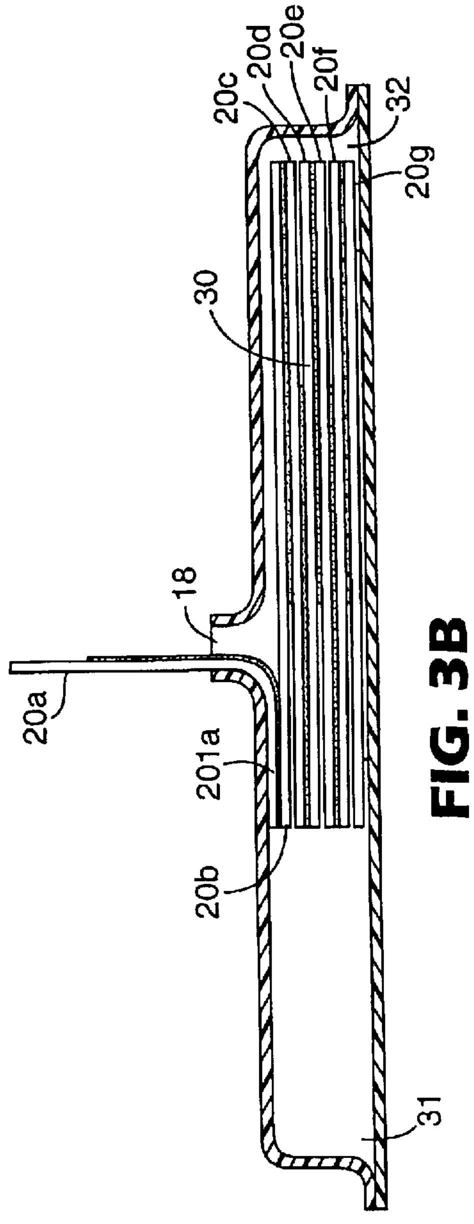
FIG. 3B depicts an enlarged sectional side view of the sheet dispenser of FIG. 3A, wherein the stack of sheets is in a second position with most of the first sheet extending through the slot and attached to a second sheet in a relaxed position.

As shown in FIG. 3B, stack of sheets 30 moves to second position 32 due to the partial removal of individual sheet 20*a* from sheet dispenser 10. At this stage of the sheet removal process, portion 201*a* of individual sheet 20*a* remains attached to second individual sheet 20*b* positioned below individual sheet 20*a*. As individual sheet 20*a* is further removed from sheet dispenser 10, a pulling force is exerted on second individual sheet 20*b* to force a portion of second individual sheet 20*b* through slot 18 along with portion 201*a* of individual sheet 20*a*. Such a configuration is shown in FIG. 3C.

Figure 3C:
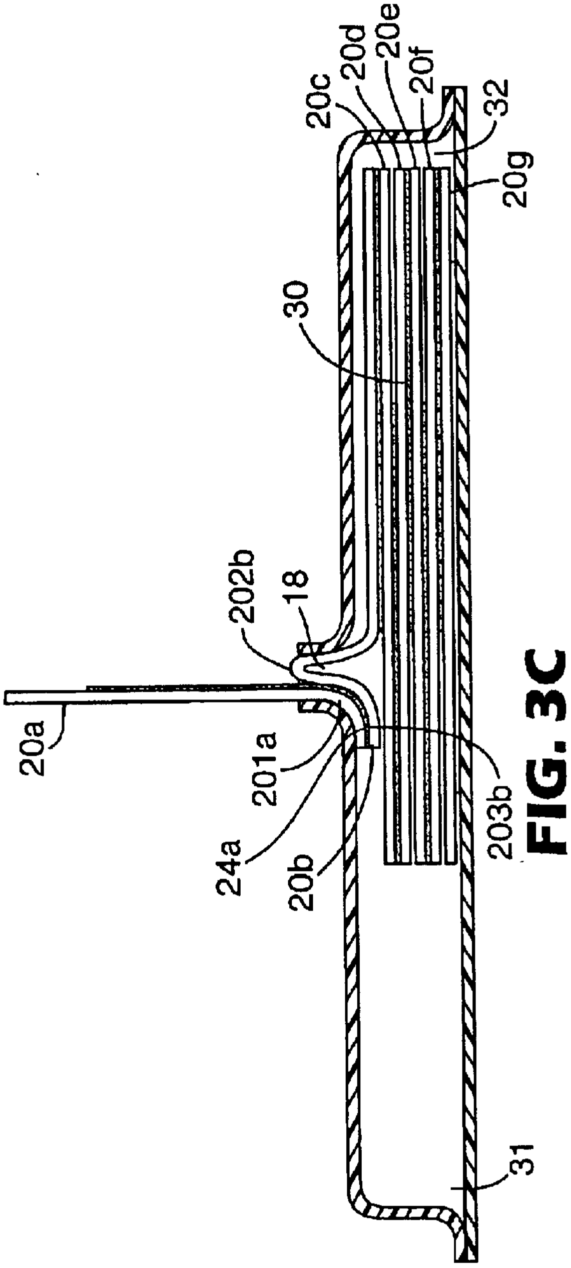
FIG. 3C depicts an enlarged sectional side view of the sheet dispenser of FIG. 3A, wherein the stack of sheets is in a second position with most of the first sheet extending through the slot and a portion of the second sheet extending through the slot.

In FIG. 3C, portion 202*b* of second individual sheet 20*b* is positioned near the mouth of slot 18. As individual sheet 20*a* is pulled from sheet dispenser 10, adhesive layer 24*a* on a lower surface of individual sheet 20*a* remains adhered to individual sheet 20*b* and causes portion 202*b* of second individual sheet 20*b* to exit slot 18. As individual sheet 20*a* is further removed from sheet dispenser 10, end portion 203*b* of individual sheet 20*b* moves closer to exit slot 18.

Figure 3D:
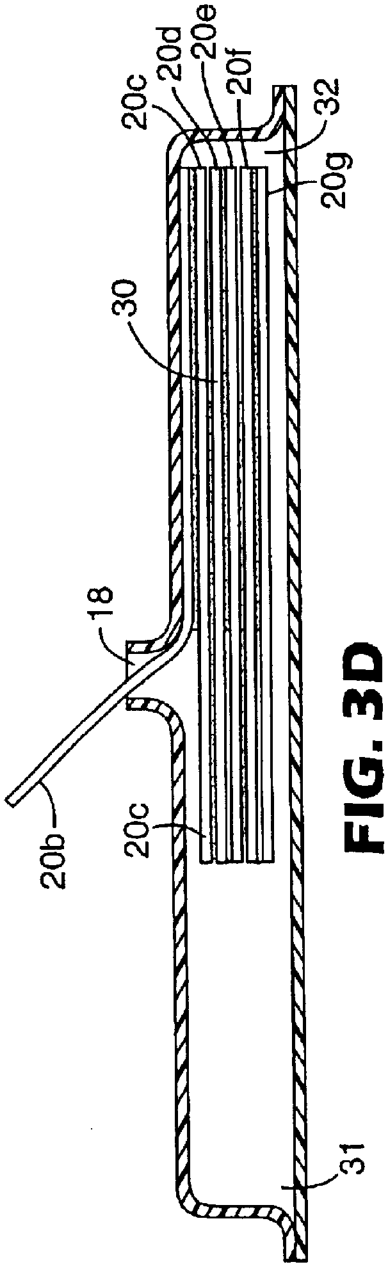
FIG. 3D depicts an enlarged sectional side view of the sheet dispenser of FIG. 3A, wherein the stack of sheets is in a second position, the first sheet is removed from the sheet dispenser and disconnected from the second sheet, and a portion of the second sheet is extending through the slot.

FIG. 3D depicts a final stage in the shuttling motion, wherein stack of sheets 30 is in second position 32, first individual sheet 20*a* is removed from sheet dispenser 10 and disconnected from second individual sheet 20*b*, and a portion of individual sheet 20*b* is extending through slot 18. At this stage, stack of sheets 30 is in position to shuttle back to first position 31 when individual sheet 20*b* is fully removed from sheet dispenser 10. As described above, the movement of stack of sheets 30 within sheet dispenser 10 results in one or more types of feedback to a user and/or one or more unique functions. Although the movement of stack of sheets 30 within sheet dispenser 10 has been described above in terms of moving from a first position 31 and a second position 32, it should be noted that movement of stack of sheets 30 to one or more intermediate positions between first position 31 and second position 32 may also result in any one of the above-described types of feedback and/or functions. One method of providing "stops" at intermediate locations between a first position 31 and a second position 32 is described below and depicted in FIGS. 4-5.

Figure 4:
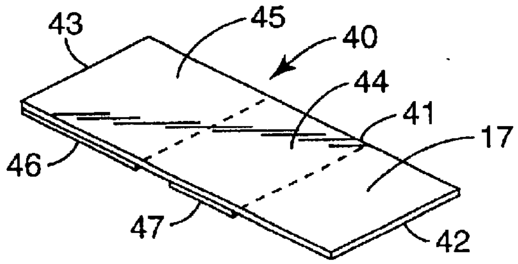
FIG. 4 depicts an exemplary individual sheet having two separate and unconnected adhesive coating layers on a lower surface of the individual sheet.

The movement of stack of sheets 30 to one or more intermediate positions or "stops" between a first position 31 and a second position 32 may be facilitated by using a stack of sheets formed from individual sheets as shown in FIG. 4. Individual sheet 40 may comprise a rectangular layer 41 having a first end 42, a second end 43, an intermediate portion 44, and an end portion 45 opposite tab portion 17. In this embodiment, rectangular layer 41 has a first adhesive coating 46 on a lower surface of end portion 45 and a second adhesive coating 47 covering a portion of a lower surface of intermediate portion 44. Individual sheet 40 may be incorporated into a stack of similar sheets and positioned within sheet dispenser 10 as shown in FIG. 5.

Figure 5:
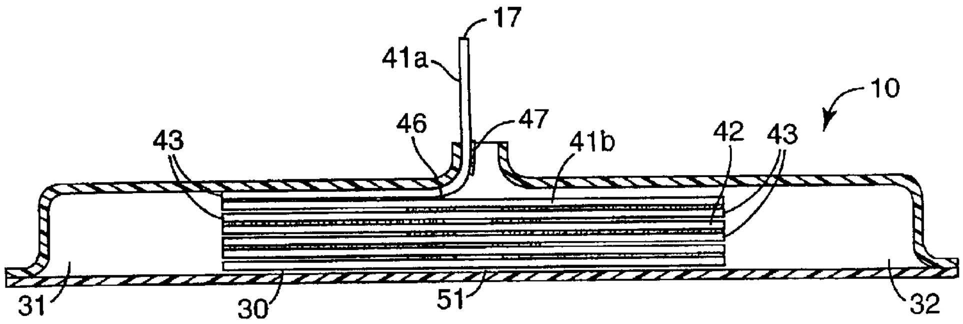
FIG. 5 depicts an enlarged sectional side view of an exemplary sheet dispenser of the present invention containing a stack of sheets, wherein each sheet is a sheet as shown in FIG. 4.

As shown in FIG. 5, stack of sheets 30 is in an intermediate position 51 between first position 31 and second position 32 within sheet dispenser 10. Stack of sheets 30 stops at intermediate position 51 when individual sheet 41*a* is partially removed from sheet dispenser 10 such that adhesive coating 47 disengages from adjacent individual sheet 41*b*. This "intermediate stop" between first position 31 and second position 32 is the result of a user applying a pull force to individual sheet 41*a*, wherein the pull force is greater than the adhesive force between adhesive coating 47 and adjacent individual sheet 41*b*, but less than the adhesive force between both (i) adhesive coating 46 and adhesive coating 47 and (ii) adjacent individual sheet 41*b*. As shown in FIG. 5, adhesive coating 46 on individual sheet 41*a* is still engaged with adjacent rectangular individual sheet 41*b*. By further removing individual sheet 41*a* from sheet dispenser 10 and disengaging adhesive coating 46 from adjacent individual sheet 41*b*, stack of sheets 30 continues to move towards second position 32.

It should be noted that two or more separate and disconnected adhesive coatings (e.g., coatings 46 and 47) may be present on a lower surface of an individual sheet in order to have multiple intermediate stops as the individual sheet is removed from sheet dispenser 10. Further, the location of the adhesive coatings may be adjusted along the lower surface of each individual sheet to control the "stop" locations of stack of sheets 30 within sheet dispenser 10 between first position 31 and second position 32.

It should be understood that other methods of producing multiple intermediate stops may be used in the present invention in addition to or independent from multiple adhesive coatings as described above. For example, stack of sheets 30 may be stopped mechanically at multiple locations between first position 31 and second position 32 within sheet dispenser 10 by placing mechanical barriers along the pathway between first position 31 and second position 32. Suitable mechanical barriers may include, but are not limited to, protrusions extending upward from the lower housing portion 13, protrusions extending downward from the upper housing portion 12, protrusions extending horizontally from side walls 15 of upper housing portion 12, or combinations thereof. In some embodiments of the present invention, a mechanical switch or electrical contact may be used to temporarily stop stack of sheets 30 between first position 31 and second position 32.

In a further embodiment of the present invention, individual sheets 40 may be coated with high release material and low release material to provide low adhesion and higher adhesion between adjacent sheets. For example, an upper surface of each individual sheet 40 may be coated with (1) one or more strips of high release material to provide one or more areas of low adhesion between adjacent sheets, and (2) one or more strips of low release material to provide one or more areas of higher adhesion between adjacent sheets. As a user pulls on an individual sheet, the stack of sheets 30 moves from first position 31 to one or more intermediate positions between first position 31 and second position 32 depending on the number of high adhesion regions on the individual sheet (i.e., the pulling force extended by a user is enough to overcome a single high adhesion region).

The dimensions of stack of sheets 30 may vary depending on a number of factors including, but not limited to, individual sheet size, number of individual sheets in the stack, and the dimensions of the sheet dispenser. The height of stack of sheets 30, $h_s$, is less than housing height, $h_h$, in order to provide free movement of stack of sheets 30 within sheet dispenser 10. Typically, the height of stack of sheets 30, $h_s$, is less than about 90% of housing height, $h_h$. Desirably, stack of sheets 30 contains from about one to about 500 individual sheets, more desirably, from about one to about 100 individual sheets.

Individual sheets 40 within stack of sheets 30 may also have a given shape and dimensions, which vary depending on the given application. Although individual sheets are described throughout the present invention as having a rectangular shape, it should be noted that individual sheets may have any shape. Suitable shapes include, but are not limited to, rectangular, square, circular, oblong, rhombus, trapezoidal, barbell, diamond, or any other shape. Typically, each individual sheet has a thickness ranging from about 0.001 to about 0.01 centimeters. As discussed above, individual sheets 40 may be formed from a variety of sheet-forming materials. Suitable sheet-forming materials include, but are not limited to, plastics, paper, metal, or combinations thereof. Desirably, the sheet-forming material comprises a polymeric material, such as, polyester (PET), polypropylene, or cellulose acetate.

Stack of sheets 30 may comprise individual sheets 40 without additional components or may comprise one or more additional components. In one embodiment of the present invention, stack of sheets 30 comprises one or more individual sheets 40 positioned on a substrate referred to as a "backsheet" (shown and described further in FIGS. 8A and 8B below). When present, the backsheet typically has identical area/dimensions (i.e., length and width) as individual sheets 40. In some embodiments, the backsheet may have a thickness greater than individual sheets 40, desirably ranging from about 0.01 to about 0.02 cm. In a further embodiment, the backsheet is transparent or translucent so that the upper surface of lower housing portion 13 is viewable through the backsheet. As discussed below, the backsheet may further comprise one or more electrical contacts when the sheet dispenser is used as a switch or sound-generating device.

A variety of adhesives may be used to form an outer coating on the individual sheets including, but not limited to, repositionable pressure sensitive adhesives and permanent PSAs. Examples of suitable repositionable pressure sensitive adhesives include, but are not limited to, repositionable pressure sensitive adhesives disclosed in U.S. Pat. No. 3,691,140 issued to Silver, and U.S. Pat. No. 4,166,152 issued to Baker et al., both of which are herein incorporated by reference in their entireties.

C. Activatable Device

In embodiments of the present invention wherein movement of the stack of sheets within the sheet dispenser generates a signal or electrical current, the sheet dispensers comprise at least one activatable device 99. Each activatable device 99 is capable of detecting and responding to movement of the stack of sheets 30 within housing 11 of sheet dispenser 10. Suitable activatable devices 99 include, but are not limited to, mechanical switches, photodiodes, electrical contacts, or combinations thereof. A number of exemplary sheet dispensers containing one or more activatable devices 99 are disclosed in FIGS. 6A-8B.

Figure 6A:
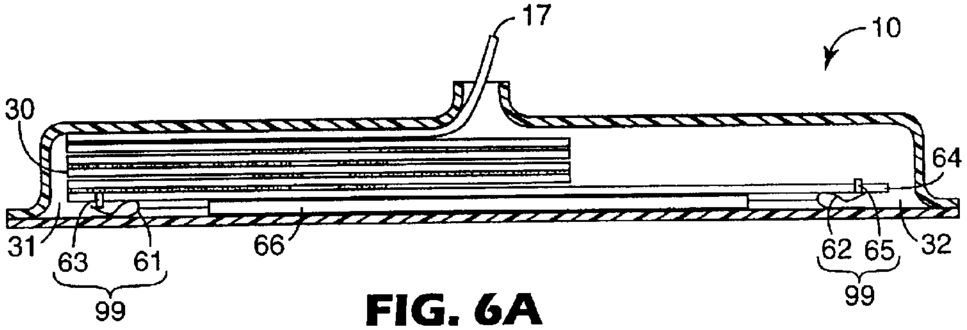
FIGS. 6A and 6B depict enlarged sectional side views of an exemplary sheet dispenser of the present invention suitable for use as a switch, wherein the sheet dispenser contains mechanical switches for setting the sheet dispenser switch in an "on" or "off" mode.
Figure 6B:
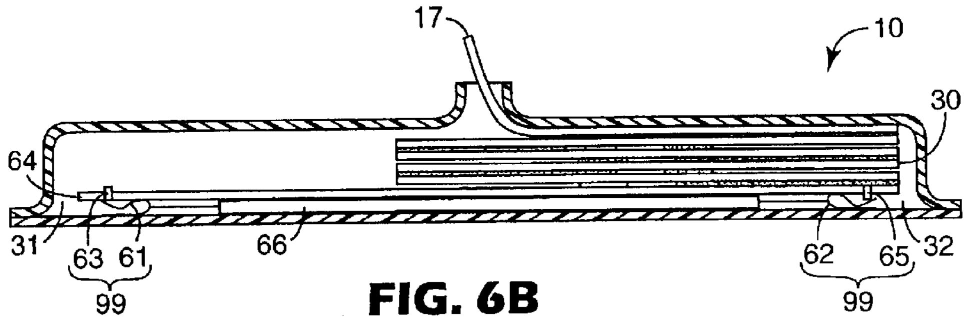

FIGS. 6A and 6B depict enlarged sectional side views of an exemplary sheet dispenser of the present invention suitable for use as a switch, wherein the sheet dispenser contains activatable devices 99 in the form of mechanical switches. As shown in FIG. 6A, mechanical switch 61 is "closed" due to the presence of stack 30 in first position 31 within sheet dispenser 10. Stack of sheets 30 forces pin 63 (protruding through shuttle substrate 64) downward pressing on mechanical switch 61 to "close" mechanical switch 61. In the "closed" position, mechanical switch 61 is activated to produce a first electrical current or other signal, which may be processed by electronics 66 and/or received by a first signal-receiving object (not shown) causing the first signal-receiving object to take some action. For example, the first signal-receiving object may be a light and the first signal may be to turn the light "on" or "off."

FIG. 6B depicts the sheet dispenser 10 of FIG. 6A after the removal of a sheet from sheet dispenser 10, resulting in the movement of stack of sheets 30 from first position 31 to second position 32. When stack of sheets 30 moves out of first position 31, mechanical switch 61 "opens" to discontinue the first signal described above. When stack of sheets 30 moves into second position 32, stack of sheets 30 forces pin 65 (also protruding through shuttle substrate 64) downward pressing on mechanical switch 62 to "close" mechanical switch 62. Mechanical switch 62 is activated to produce a second electrical current or signal, which may also be processed by electronics 66 and/or received by the first signal-receiving object (not shown) or a second signal-receiving object (not shown) causing either or both of first and second signal-receiving objects to take some action.

A variety of mechanical switches may be used in the present invention as suitable mechanical switches 61 and 62. Suitable mechanical switches include any pair of conductive members, which are positioned in stationary positions relative to one another and may be connected to one another via pressure exerted on one or both of the conductive members. Suitable conductive members include, but are not limited to, conductive wire, film, foil, and a substrate coated with a conductive material.

Figure 7A:
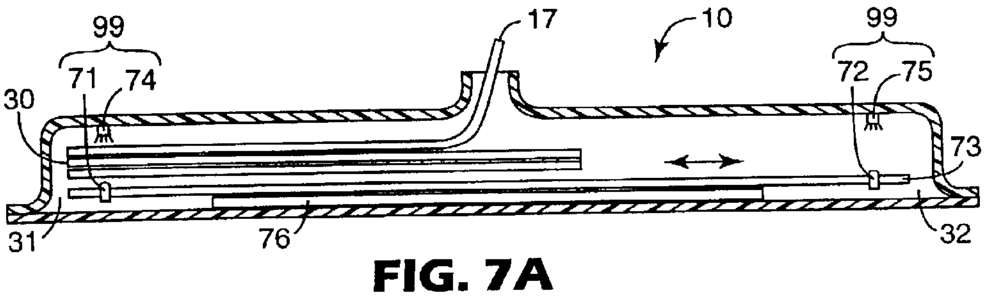
FIGS. 7A and 7B depict enlarged sectional side views of an exemplary sheet dispenser of the present invention suitable for use as a switch, wherein the sheet dispenser contains photodiodes for setting the sheet dispenser switch in an "on" or "off" mode.
Figure 7B:
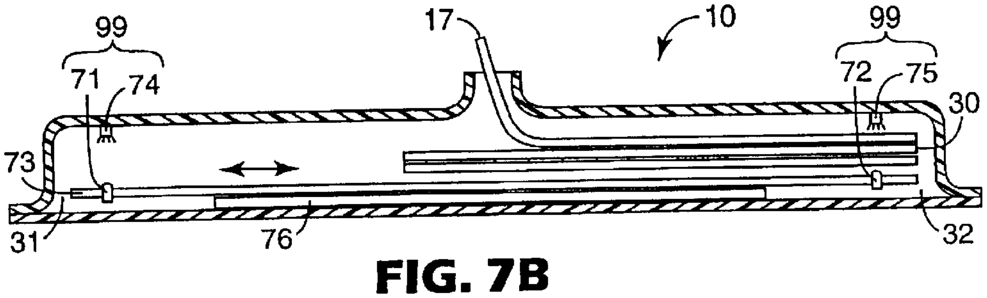

FIGS. 7A and 7B depict enlarged sectional side views of an exemplary sheet dispenser 10 of the present invention suitable for use as a switch, wherein the sheet dispenser 10 contains activatable devices 99 in the form of photodiodes. The photodiodes perform similarly to mechanical switches 61 and 62. As shown in FIG. 7A, photodiode 71 (protruding through shuttle substrate 73) receives light from LED 74. When stack of sheets 30 moves into first position 31, the beam of light from LED 74 to photodiode 71 is interrupted. A first signal is produced. The first signal may be processed by electronics 76 and/or received by a first signal-receiving object (not shown) causing the first signal-receiving object to take some action. For example, the first signal-receiving object may be a timer and the first signal may be to turn the timer "on" or "off."

FIG. 7B depicts the sheet dispenser 10 of FIG. 7A after the removal of a sheet from sheet dispenser 10, resulting in the movement of stack of sheets 30 from first position 31 to second position 32. When stack of sheets 30 moves out of first position 31, the beam of light between LED 74 and photodiode 71 is reconnected. Reconnection of the light between LED 74 and photodiode 71 may produce a second signal, which may be used to activate an activatable device. When stack of sheets 30 moves into second position 32, stack of sheets 30 interrupts the beam of light between LED 75 and photodiode 72 (also protruding through shuttle substrate 73). A third signal is produced. The third signal may also be processed by electronics 76 and/or received by the first signal-receiving object (not shown) or a second signal-receiving object (not shown) causing either of both of first and second signal-receiving objects to take some action.

Although not shown in FIGS. 7A and 7B, it should be noted that electrical wiring may be used to connect LEDs 71 and 75 and photodiodes 71 and 72 to electronics 76.

Figure 8A:
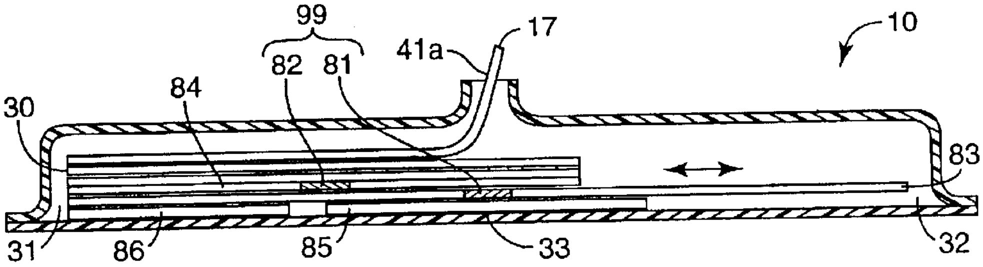
FIGS. 8A and 8B depict enlarged sectional side views of an exemplary sheet dispenser of the present invention suitable for use as a switch, wherein the sheet dispenser contains electrical contacts for setting the sheet dispenser switch in an "on" or "off" mode.
Figure 8B:
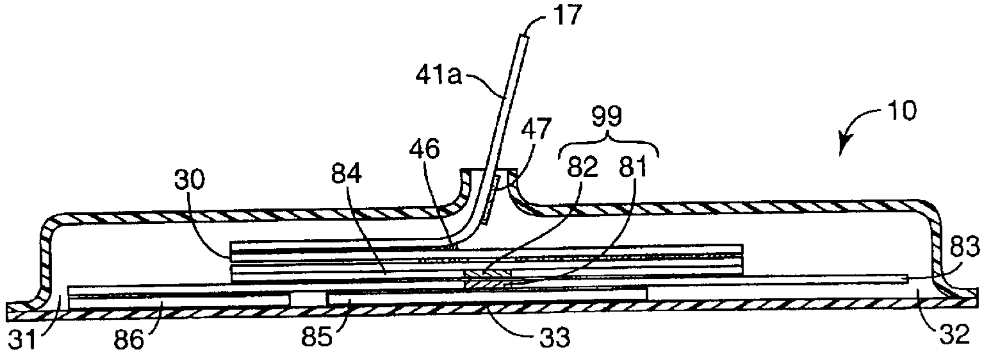

FIGS. 8A and 8B depict enlarged sectional side views of an exemplary sheet dispenser 10 of the present invention suitable for use as a switch, wherein the sheet dispenser 10 contains activatable devices 99 in the form of electrical contacts. The electrical contacts work similarly to mechanical switches 61 and 62, but in some cases, one or more male electrical contacts may move relative to one or more female electrical contacts as described below. As shown in FIG. 8A, a first electrical contact 81 (e.g., male contact) is located in a fixed position within shuttle substrate 83. Stack of sheets 30 is supported by backsheet 84. A second electrical contact 82 (e.g., female contact) is located within backsheet 84 and moves from first position 31 to second position 32 along with stack of sheets 30. As shown in FIG. 8A, stack of sheets 30 is located in first position 31, and first electrical contact 81 is not in contact with second electrical contact 82. At this time, the sheet dispenser switch is in an "off" position.

FIG. 8B depicts the sheet dispenser 10 of FIG. 8A after the partial removal of sheet 41*a* from sheet dispenser 10, resulting in the movement of stack of sheets 30 from first position 31 to third position 33. At this location, first electrical contact 81 comes into contact with second electrical contact 82. Sheet dispenser "switch" 10 goes into an "on" mode, and a first signal is produced. The first signal may be processed by electronics 85 and/or received by a first signal-receiving object, such as speaker 86, causing the first signal-receiving object to take some action (i.e., play music). Speaker 86 may remain "on" for a fixed period of time or may stay "on" until further action is taken (i.e., when first electrical contact 81 comes into contact with second electrical contact 82 again on the return to first position 31).

Although not shown, stack of sheets 30 moves to second position 32 once sheet 41*a* is completely removed from sheet dispenser 10 disconnecting first electrical contact 81 from second electrical contact 82. Electrical contacts 81 and 82 may be formed from any conductive material and have a structural shape, similar to conductive members described above. The area dimensions of contact surfaces of electrical contacts 81 and 82 may be the same size or may differ from one another. In one embodiment, the stationary electrical contact (i.e., electrical contact 81) may have a larger contact surface area than the mobile electrical contact (i.e., electrical contact 82) to ensure proper connection between the stationary electrical contact and the mobile electrical contact even if the stack position varies slightly along the single pathway between first position 31 and second position 32.

It should be noted that in each of the embodiments disclosed in FIGS. 6A-8B, any number of activating devices 99 may be used and placed at any number of desired location within sheet dispenser 10. In some cases, only one activating device 99 (e.g., single mechanical switch or single set of electrical contacts) is desired. In other cases, two or more activating devices 99 may be desired.

D. Power Source

The sheet dispensers of the present invention may comprise a power source either within the sheet dispenser or connected thereto. Suitable power sources include, but are not limited to, direct current (DC) from a DC power supply or alternating current (AC) from an AC power supply. Desirably, the sheet dispenser contains one or more batteries or solar cells within the sheet dispenser or is connected to an external power source, such as an AC power supply (i.e., wall plug) or a universal serial bus (USB) port from a personal computer.

E. Optional Components

Figure 9:
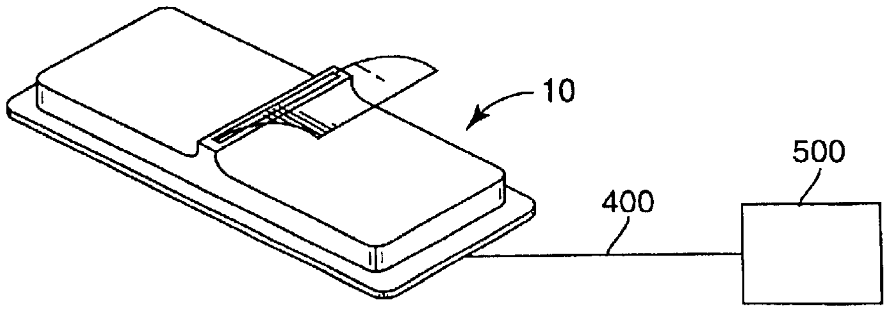
FIG. 9 depicts a sheet dispenser in combination with a signal-receiving device.

In addition to the sheet dispenser components described above, the sheet dispensers may comprise one or more optional components either within the sheet dispenser or externally connected to the sheet dispenser as described below and as shown in FIG. 9. FIG. 9 depicts sheet dispenser 10 in combination with a signal-receiving device 500. Signal-receiving device 500 may be any device capable of receiving a signal from sheet dispenser 10 including, but not limited to, any of the devices described herein such as visual feedback-generating devices, audio feedback-generating devices, aromatic feedback-generating devices, lights, etc., some of which are described below. In some cases, electrical wiring 400 may be used to transport a signal from sheet dispenser 10 to signal-receiving device 500. In other embodiments wherein sheet dispenser 10 produces a wireless signal, electrical wiring 400 is not necessary.

1. Electronics

As described previously with respect to FIGS. 6A-8B illustrated above, in some embodiments of the present invention, the sheet dispensers may comprise electronics to process one or more signals produced by one or more activating devices. The one or more signals may be used by one or more signal-receiving devices to produce visual, audio, aromatic, or any other type of feedback to a user and/or provide some function for a user.

2. Speaker/Sound Generating Device

As shown in FIGS. 8A-8B above, in some embodiments of the present invention, the sheet dispensers may comprise one or more speakers 86 or other sound-generating devices either within the sheet dispenser or externally connected to the sheet dispenser to provide audio feedback to a user.

3. Lights

In some embodiments of the present invention, the sheet dispensers may comprise one or more lights positioned within the sheet dispenser or externally connected to the sheet dispenser to provide visual feedback or heat to a user.

4. Other Electrical Devices

In some embodiments of the present invention, the sheet dispenser may be externally connected to one or more signal-receiving devices 500, including electrical devices other than lights to provide any of the above-mentioned types of feedback or some other function for a user. Suitable signal-receiving devices 500 include, but are not limited to, a gas burner, a gas log fireplace, a stopwatch or timer, an alarm clock, a vehicle ignition system, a room deodorizer, and a stove or other appliance.

5. Personal Computing Device

In one desired embodiment of the present invention, the sheet dispenser provides a signal to signal-receiving device 500 in the form of an external personal computing device. Suitable personal computing devices include, but are not limited to, a personal computer, a calculator, a hand-held computer, an electronic hand-held organizer (e.g., a Palm® pilot, manufactured by Palm Inc., Milpitas, Calif.), an email-receiving device (e.g., a BlackBerry® wireless e-mail device, manufactured by Research In Motion, Ltd., Waterloo, ON, Canada), a cell phone or other portable computing device.

In one exemplary sheet dispenser system of the present invention, the sheet dispenser system comprises (i) a sheet dispenser containing (a) one or more activatable devices and (b) electronics for communicating with a signal-receiving device, in combination with (ii) a personal computer. In this embodiment, at least one of activatable device produces a signal, which is received by a microprocessor. The microprocessor processes the received signal and sends a message to a personal computer. The message send by the microprocessor passes through a universal serial port (USB) interface and a USB port of the personal computer. In this exemplary embodiment, power may be supplied to the electronics (i.e., microprocessor) and the activatable device from the personal computer through the USB port of the personal computer and the USB interface within the electronics. It should be noted that the sheet dispenser containing at least one activatable device may also contain a separate power source within the sheet dispenser housing as described above.

One exemplary microprocessor suitable for use in the electronics of the sheet dispenser is an integrated circuit (IC) designated EZ-USB, which is commercially available from Cypress Semiconductor (Santa Clara, Calif.). It should be noted that the present invention is not limited in any way to the EZ-USB IC, which is provided as one example of a suitable electronic component for use in the present invention.

6. Scent-Producing Components

In a further desired embodiment, the sheet dispensers of the present invention produce aromatic feedback to a user. In this embodiment, the sheet dispensers of the present invention contain one or more scent-producing components. One such dispenser is shown in FIG. 10.

Figure 10:
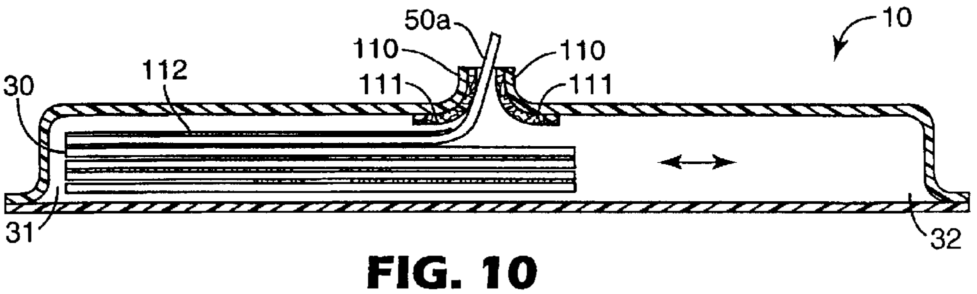
FIG. 10 depicts an enlarged sectional side view of an exemplary sheet dispenser of the present invention suitable for use as a room deodorizer or a flame-generating device.

FIG. 10 depicts an enlarged sectional side view of an exemplary sheet dispenser of the present invention suitable for use as a scent-producing device or room deodorizer. As shown in FIG. 10, sheet dispenser 10 contains stack of sheets 30, which moves from first position 31 to second position 32 upon removal of sheet 50*a* from sheet dispenser 10. In this embodiment, slot exit walls 110 are coated with a textured or roughened surface material 111 to increase the amount of friction between sheet 50*a* and the interior surfaces of sheet dispenser 10 in the vicinity of slot 18.

In this embodiment, all of the sheets within stack of sheets 30 may have a coating on an upper surface of each sheet. As shown in FIG. 10, sheet 50*a* has an upper coating 112 thereon. Upper coating 112 comprises one or more scent-producing components. In one embodiment of the present invention, the scent-producing components are in the form of hollow spheres (not shown). The hollow spheres contain a fragrance or perfume. When upper coating 112 passes along textured or roughened surface material 111, the hollow spheres break, releasing the fragrance or perfume into the surrounding air.

Suitable hollow spheres, fragrances and perfume include, but are not limited to, those disclosed in U.S. Pat. Nos. 4,487,801; 4,493,869; 4,720,417; 4,720,413; 4,889,755; 4,925,517; 5,039,243; and 5,391,374, the entirety of all of which are hereby incorporated by reference.

In a further embodiment of the present invention, the scent-producing components are present as a perfume or fragrance on an outer surface of each individual sheet of the stack of sheets. In this embodiment, the configuration of the stack of sheets minimizes exposure of the perfume or fragrance into the environment until an individual sheet is removed from the stack of sheets. In other words, the perfume or fragrance is contained between adjacent sheets within the stack of sheets, but not encapsulated as with the hollow spheres described above. By removing an individual sheet from the stack of sheets, an exposed surface of the individual sheet releases perfume or fragrance into the environment. It should be noted that in this embodiment, textured or roughened surface material 111 described in FIG. 10 above is not necessary to produce a scent.

As described above, in other embodiments of the present invention, movement of the stack of sheets from a first location to a second location within the sheet dispenser may cause a signal (or electrical current) to be sent to a scent-generating device, which produces aromatic feedback to a user. The scent-generating device may comprise a room deodorizer or pump sprayer.

7. Flame-Producing Components

In yet a further desired embodiment, the sheet dispensers of the present invention produce feedback to a user in the form of a flame. In this embodiment, the sheet dispensers of the present invention may contain flame-producing components. Referring again to FIG. 10, such a sheet dispenser comprises a textured or roughened surface material 111 to increase the amount of friction between sheet 50*a* and the interior surfaces of sheet dispenser 10 in the vicinity of slot 18 as described above. The textured or roughened surface material 111 may be similar to the material found on a matchbox or may be any other abrasive material. In addition, upper coating 112 comprises a match-like material. In this embodiment, upper coating 112 typically comprises a composition containing potassium chlorate, white phosphorus and sulfur, which are common components found in matches. When the match-like material of upper coating 112 passes along the matchbox-like material of roughened surface material 111, sheet 50*a* produces a flame. In this embodiment, at least a portion of sheet 50*a* is a combustible material, such as paper.

As described above, in other embodiments of the present invention, movement of the stack of sheets from a first location to a second location within the sheet dispenser may cause a signal (or electrical current) to be sent to a fire-starting device, which produces the flame.

II. Methods of Making Sheet Dispensers

The present invention is also directed to a method of making sheet dispensers, which are capable of providing one or more types of feedback and/or a unique function to a user.

In one embodiment of the present invention, the method of making sheet dispensers comprises incorporating one or more activatable devices 99 into the housing (11 and 12) of the sheet dispenser 10. The one or more activatable devices 99 may be positioned within the housing (11 and 12) so as to detect movement of a stack of sheets 30 within the housing (11 and 12). The method may further comprise incorporating one or more additional components within or connected to the sheet dispenser 10 as described above. Each component may be attached to the housing (11 and 12) or other sheet dispenser component using conventional techniques including, but not limited to, adhesives, soldering, mechanical fasteners (i.e., screws, etc.).

Typically, as shown in FIG. 1, sheet dispenser 10 comprises upper housing portion 12 temporarily bonded to lower housing portion 13. The method of making sheet dispenser 10 may comprise a molding process, wherein upper housing portion 12 is molded from a thermoformable material, such as plastic. Lower housing portion 13 may also be formed by a molding process when formed of plastic material, or may be formed by a papermaking process when formed from cellulosic materials. Upper housing portion 12 may be temporarily bonded to lower housing portion 13 via a pressure sensitive adhesive, tape, or mechanical fasteners, such as staples or clamps.

In some embodiments of the present invention, the method of making sheet dispenser 10 comprises incorporating electronic circuitry into the sheet dispenser 10. In one embodiment of the present invention, electronic circuitry (not shown) is printed directly onto a surface of upper housing portion 12, lower housing portion 13, shuttle substrate 64 (shown in FIGS. 6A-6B), backsheet 84 (shown in FIGS. 8A-8B), or a combination thereof. Printing techniques suitable for use in the present invention include, but are not limited to, ink jet printing, screen printing, and conventional etching/photoresist methods. Electronic circuitry may also be printed onto an adhesive label, which is subsequently adhered to a surface of upper housing portion 12, lower housing portion 13, shuttle substrate 64 (shown in FIGS. 6A-6B), backsheet 84 (shown in FIGS. 8A-8B), or a combination thereof.

In further embodiments of the present invention, the method of making sheet dispenser 10 comprises applying a textured or roughened coating material 111 onto a surface of upper housing portion 12 in order to increase the amount of friction between a sheet 50*a* being removed from the sheet dispenser 10 and an interior surface 110 of the housing in the vicinity of the sheet dispenser slot (as shown in FIG. 10). The textured or roughened coating material 111 may comprise a material suitable for rupturing hollow spheres when the hollow spheres come into contact with the textured or roughened coating material 111. Alternatively, the textured or roughened coating material 111 may comprise a matchbox-like material, which causes a match or match-like material to ignite during contact with the textured or roughened coating material 111. In this embodiment, the method may further comprise a step of coating an upper surface of an individual sheet, wherein the coating 112 comprises (1) hollow spheres containing a fragrance or perfume, or (2) a match-like material.

The step of applying a roughened or textured material 111 proximate slot 18 of sheet dispenser 10 may be performed in a number of ways including, but not limited to, a coating process or a molding process. The roughened or textured material 111 may be coated onto a surface of upper housing portion 12 using conventional coating methods. Alternatively, roughened or textured material 111 may be applied to a surface of upper housing portion 12 during a molding process, wherein (i) a strip of roughened or textured material 111 is positioned on the thermoformable part used to form upper housing portion 12 (i.e., prior to or after an initial molding step to form upper housing portion 12), and (ii) then subjected to a molding step to secure the roughened or textured material 111 to the thermoformable part.

III. Specific, Exemplary Applications

As discussed above, the sheet dispensers have a number of new uses unlike conventional sheet dispensers. A few exemplary uses are given below.

A. Use as an Advertising Medium

Figure 11:
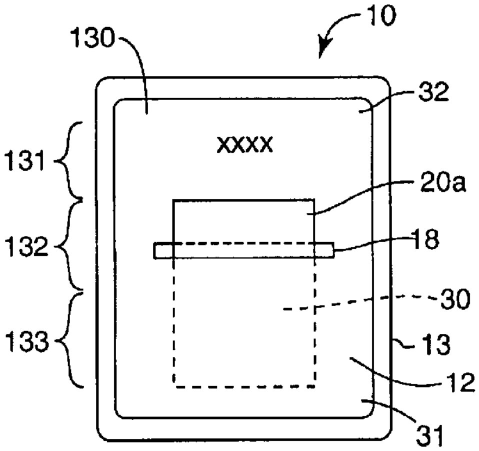
FIG. 11 depicts a top schematic view of an exemplary sheet dispenser of the present invention suitable for use as an advertising medium, wherein a stack of sheets is in a first position.

In one desired embodiment of the present invention, the sheet dispenser 10 provides visual and/or audio feedback to a user in the form of an advertising medium. An exemplary sheet dispenser of the present invention suitable for use as an advertising medium is shown in FIG. 11. FIG. 11 provides a top schematic view of a sheet dispenser 10, such as sheet dispenser 10 in FIG. 1. In sheet dispenser 10 of FIG. 11, upper housing portion 12 is transparent or translucent, such that upper surface 130 of lower housing portion 13 is viewable through upper housing portion 12. Upper surface 130 comprises three surface regions: first region 131, second region 132 and third region 133. As shown in FIG. 11, first region 131 is viewable through upper housing portion 12 when stack of sheets 30 is in first position 31; however, when stack of sheets 30 is in first position 31, stack of sheets 30 covers second region 132 and third region 133, making these regions temporarily unviewable.

Any coated, printed or written image may be present on one or more of first region 131, second region 132 and third region 133. The coated, printed or written image may be any indicia, such as a company name or slogan, or may be any other message or image for a viewing sheet dispenser user. As shown in FIG. 11, first region 131 contains the printed indicia "XXXX." As a user removes individual sheet 20*a* from stack of sheets 30 through slot 18, stack of sheets 30 moves to second position 32 as shown in FIG. 12.

Figure 12:
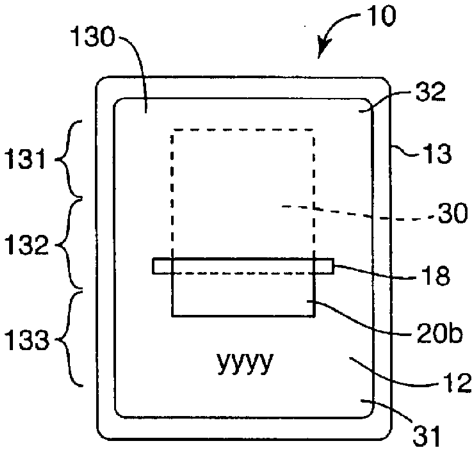
FIG. 12 depicts the exemplary sheet dispenser of FIG. 11, wherein the stack of sheets is in a second position.

In FIG. 12, stack of sheets 30 is in second position 32. In this position, third region 133 is viewable, but first region 131 and second region 132 are blocked from view by stack of sheets 30. As shown in FIG. 12, third region 133 contains the printed indicia "YYYY". As a user removes individual sheet 20*b* from stack of sheets 30, stack of sheets 30 moves back to first position 31 as shown in FIG. 11.

As discussed above, a coated, printed or written image may be present in any one of first region 131, second region 132 and third region 133. In one embodiment of the present invention, indicia may be present in all three regions, such that indicia in second region 132 is viewable once all of the individual sheets in stack of sheets 30 are dispensed. One example of this embodiment is a sheet dispenser game, wherein the prize is displayed in second region 132. A top schematic view of an exemplary sheet dispenser 10 suitable for use as a sheet dispenser game is shown in FIG. 13.

Figure 13:
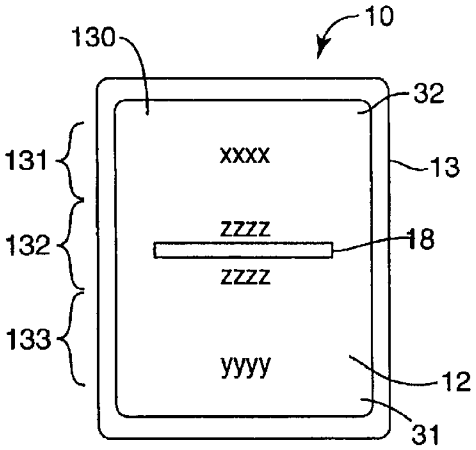
FIG. 13 depicts a top schematic view of an exemplary sheet dispenser for a sheet dispenser game, wherein the stack of sheets is fully dispensed.

The exemplary sheet dispenser 10 shown in FIG. 13 contains printed indicia "XXXX" in first region 131 and printed indicia "YYYY" in third region 133. One possible sheet dispenser game is one in which first region 131 displays print indicia such as "Dispense all of the Post-it® Flags" and third region 133 displays print indicia such as "And claim your prize!". During dispensing of individual sheets from a stack of sheets (not shown), the printed indicia in first region 131 and third region 133 are viewable by a user depending on the position of the stack of sheets. Once all of the individual sheets are dispensed, printed indicia in second region 132 is viewable to the user. As shown in FIG. 13, second region 132 contains printed indicia "ZZZZ" above and below slot 18. However, in the above-mentioned exemplary sheet dispenser game, second region 132 may display to a user a message indicating the game prize, if any, such as print indicia "You Win! $1,000,000".

In any of the above described sheet dispensers suitable for use as an advertising medium, the sheet dispenser may contain one or more additional features described above including, but not limited to, a sound-generating device, a scent-generating device, a light-generating device; a flame-generating device, and a switch-activating device. In one embodiment of the present invention, the sheet dispenser as shown in FIGS. 11 and 12 may also contain a sound-generating device, such as shown in FIGS. 8A and 8B, to produce a sound upon partial or complete removal of an individual sheet from the sheet dispenser. For example, in addition to visual advertising for a company or a company's product, the sheet dispenser may play the company's song or any other audio upon partial or complete removal of an individual sheet from the sheet dispenser.

It should be understood that in any of the above described sheet dispensers including those suitable for use as an advertising medium, individual sheets within the stack of sheets may be printed or coated with a desired image, indicia or message to a user.

B. Use as a Switch

In one desired embodiment of the present invention, the sheet dispensers may be used to provide a unique function, namely as a switch as described above. The sheet dispenser switch may be used to turn "on" or "off" one or more electrical devices. The sheet dispenser switch may be activated by one or more methods described below.

In one embodiment of the present invention, a first method of activating a switch is disclosed, wherein the method comprises a step of at least partially removing a first sheet from a stack of sheets within a sheet dispenser, wherein the step of at least partially removing a first sheet moves the stack of sheets from a first position to an intermediate position between the first position and a second position within the sheet dispenser (as was previously described with respect to FIGS. 4, 5 and 8A-8B). The movement of the stack of sheets within the sheet dispenser results in a switching mechanism. In an alternative embodiment, a second method comprises a step of completely removing a first sheet from the sheet dispenser, which causes the stack of sheets to move from a first position to a second position within the sheet dispenser (as was previously described with respect to FIGS. 3A-3D).

In the first method or the second method, the method may further comprise one or more of the following steps:

(1) positioning the sheet dispenser proximate to a switch-activated object, wherein the switch-activated object comprises, for example, at least one of a light source, a room deodorizer, a fireplace, a gas stove, and a personal computer;

(2) forming a conductive path between the sheet dispenser and a switch-activated object;

(3) in the first method, wherein the step of at least partially removing the first sheet from the sheet dispenser activates the switch, the first method comprises an additional step of completely removing the first sheet from the sheet dispenser to deactivate the switch;

(4) in the second method, wherein the step of completely removing the first sheet activates the switch, the second method comprises an additional step of completely removing a second sheet to deactivate the switch;

(5) inputting a new stack of sheets into the sheet dispenser;

(6) in response to the step of at least partially removing or completely removing the first sheet from the sheet dispenser, sending a signal to a signal-receiving object, wherein the signal is an electrical signal, an audio signal, a wireless signal, or a combination thereof;

(7) associating the sheet dispenser with a signal-receiving object, and the signal-receiving object is a personal computer, hand-held computer, an e-mail receiving device, or other portable device;

(8) associating the sheet dispenser with a signal-receiving object, wherein the signal-receiving object monitors one or more features of the stack of sheets including, but not limited to, (a) a total number of sheets removed from the dispenser, (b) a last sheet completely removed from the dispenser, (c) a position of a sheet within the dispenser, wherein the position is either (i) ready to be completely removed from the dispenser or (ii) ready to be partially removed from the dispenser, and (d) a number of sheets remaining in the stack, or a combination thereof; and (9) associating the sheet dispenser with a signal-receiving object, wherein the signal-receiving object is a personal computer, and a set of data is associated with one or more sheets removed from the sheet dispenser.

C. Use as a Switch in Combination with a Personal Computer

In a further desired embodiment of the present invention, the sheet dispenser is used in combination with a personal computer to provide a particular function and/or feedback to a user, namely, the ability to associate data inputted into a computer with a particular flag removed from the sheet dispenser. The sheet dispenser may be connected to a personal computer via a USB port. Each sheet removed from the sheet dispenser may be associated with a set of data entered into the personal computer via a user interface, such as a keyboard, document scanning device, etc. For example, a sheet removed from the sheet dispenser may be placed on a document to flag the document. Data related to the document may already be in the personal computer or may be entered immediately prior to or after removal of the sheet from the sheet dispenser.

In this embodiment, a method of associating a set of data with one or more sheets removed from a sheet dispenser is disclosed, wherein the method comprises (a) at least partially removing a first sheet from a stack of sheets within a sheet dispenser, wherein the step of at least partially removing a first sheet shifts the stack of sheets from a first position to a second position within the sheet dispenser; and (b) inputting a set of data into a personal computer via a user interface, wherein the set of data is associated with the first sheet.

In this embodiment, computer software on the personal computer may be used to monitor the activity of the switch. Upon receiving a signal generated by the switch in the dispenser (i.e., a change in position of the stack of sheets), the software executes one or more appropriate actions, such as initiation of KwikTag™ software, a software package commercially available from ImageTag, Inc. (Chandler, Ariz.). Coupling of the sheet dispenser of the present invention with the KwikTag™ software leads to a number of desirable results.

Prior to the present invention, a user was required to enter a barcode value from a first tag (or sheet) of a new pad (i.e., stack of sheets) into the KwikTag™ software. After each tag (or sheet) was dispensed and attached to a document, the user was required to launch the software, enter the tag number on the document, move to the data entry interface, and then add descriptors for the document to be scanned. While the KwikTag™ software was sophisticated enough to assist the user in every phase of this operation, the loose coupling of (1) the tag dispensing operation, (2) the scanning of documents, and (3) the entry of data offered significant opportunity for errors, especially omission errors. As with any loosely coupled system, the opportunity for tags and associated data to become "out of sync" was significant and created a generally unsatisfactory system.

The present invention eliminates possible errors in the above-described process. In one embodiment of the present invention, a user still enters the first barcode number from the first sheet of a new pad (or stack or sheets). When a document is to be scanned, a tag is dispensed. The resident software on the PC senses the dispenser's switch activation, and launches the KwikTag™ software. The interface of the software is immediately switched to the data entry interface, with the barcode number of the current tag. Upon completing the data entry, the user submits the document description, the counter increments by one, and the KwikTag™ software closes. The resident software then continues to monitor the USB port for further sheet dispensing. Bar codes from additional tags removed from the sheet dispenser are already calculated by the software, eliminating the need to input additional barcode information. By tying the dispensing action directly to the data entry interface, the coupling between the physical, tagged document and its associated digital data is tightened significantly, increasing system accuracy and user satisfaction, while streamlining the document archiving process.

D. Use as a Scent-Generating Device

In another embodiment of the present invention, the sheet dispensers may be used as a scent-generating device as described above.

E. Use as a Flame-Generating Device

In yet another embodiment of the present invention, the sheet dispensers may be used as a flame-generating device as described above.

F. Use as a Switch and a Scent-Generating Device

In a further embodiment of the present invention, the sheet dispensers may be used as both a switch and a scent-generating device (or a flame-generating device) as described above. For example, the switch component of the sheet dispenser may turn off an alarm clock when a sheet is removed from the sheet dispenser, while the scent-generating component provides a fresh scent to aid in waking-up a user.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A sheet dispenser capable of providing feedback to a user or a function ether than dispensing sheets, said feedback comprising (a) visual feedback of indicia positioned under a stack of dispensable sheets within a housing of the sheet dispenser and viewable upon movement of the stack of sheets within the housing; (b) visual feedback from a visual feedback-generating, signal-receiving device within or outside of the housing; (c) audio feedback from an audio feedback-generating, signal-receiving device within or outside of the housing; (d) aromatic feedback (i) from within the housing or (ii) from an aromatic feedback-generating, signal-receiving device within or outside of the housing; or (e) a combination thereof; and wherein said function comprising (A) sending a signal to a signal-receiving device within or outside of the housing.

2. The sheet dispenser of claim 1, wherein the sheet dispenser provides visual feedback of indicia positioned under a stack of sheets within a housing of the sheet dispenser and viewable upon movement of the stack of shcets within the housing; said housing comprising:

an upper housing member having an opening therein; and a lower housing member having an upper surface at least temporarily attached to the upper housing member; and wherein the stack of dispensable sheets is positioned between the upper housing member and the lower housing member and shuttles from a first position to a second position within the housing during removal of a sheet from the stack of sheets.

3. The sheet dispenser of claim 2, wherein the upper housing member is transparent or translucent such that the upper surface of the lower housing member and the stack of sheets are viewable through the upper housing member, and wherein the upper surface of the lower housing member has one or more images on the upper surface of the lower housing member, at least one image being viewable when the stack of sheets is in the first position or the second position.

4. The sheet dispenser of claim 2, wherein the upper surface of the lower housing member has two or more images on the upper surface of the lower housing member, at least one image being viewable when the stack of sheets is in the first position and at least one image being viewable when the stank of sheets is in the second position.

5. The sheet dispenser of claim 2, wherein the upper surface of the lower housing member has three or more images on the upper surface of the lower housing member, at least one image being viewable when the stack of sheets is in the first position, at least one image being viewable when the stack of sheets is in the second position, and at least one image being viewable once the stack of sheets is fully dispensed.

6. The sheet dispenser of claim 1, wherein the sheet dispenser is capable of sending a signal to a signal-receiving device within or outside of the housing, said sheet dispenser comprises:

at least crne activatable device, wherein the at least one activatable device is activated by movement of the stack of sheets within the housing.

7. The sheet dispenser of claim 6, wherein the at least one activatable device comprises a mechanical switch, a photodiode, a pair of male and female electrical contacts, or a combination thereof.

8. The sheet dispenser of claim 7, wherein the at least one activatable device comprises a mechanical switch, wherein the mechanical switch is "on" when the stack of sheets closes the mecbamcal switch and "off" when the mechanical switch is open.

9. The sheet dispenser of claim 7, wherein the at least one aetivatable device comprises a first mobile electrical contact on the stack of sheets and a second stationazy electrical contact, wherein the second stationary electrical contact forms at least a portion of a shuttle pathway between a first position and a second position.

10. The sheet dispenser of claim 7, wherein the at least one activatable device is "on" when the stack of sheets interrupts a beam of light from a light sensor to the photodiode.

11. The sheet dispenser of claim 1, wherein the sheet dispenser 18 capable of providing audio feedback from an audio feedback-generating, signal-receiving device within or outside of the housing, said sheet dispenser comprising:

a sound-generating device positioned within the sheet dispenser or external to the sheet dispenser.

12. The sheet dispenser of claim 1, wherein the sheet dispenser is capable of providing aromatic feedback, said sheet dispenser comprising:

an opening in the housing for dispensing individual sheets, said opening being surrounded by opening side walls having an exterior side wall surface and an interior side wall surface;

a textured coating on at least a portion of the interior side wall surface of the opening side walls for increasing an amount of friction between a sheet removed from the sheet dispenser and an inner surface of the housing;

wherein at least one sheet in the stack of sheets has a sheet coating on an upper surface of the sheet and at least a portion of the sheet coating separates from the sheet when the sheet passes over the textured coating.

13. The sheet dispenser of claim 12, wherein the sheet coating comprises hollow microspheres.

14. The sheet dispenser of claim 13, wherein the hollow microspheres contain a fragrance or perfume.

15. The sheet dispenser of claim 12, wherein the sheet coating comprises a combustible composition containing potassium chlorate, white phosphorus and sulfur.

16. The sheet dispenser of claim 12, wherein the sheet dispenser is capable of providing aromatic feedback by sending a signal to an aromatic fcedback-generating, signal-receiving device within or outside of the housing.

17. A method of making the sheet dispenser of claim 2, said method comprising:

applying indicia onto the upper surface of the lower housing member;

placing the stack of sheets onto the upper surface of the lower housing member; and attaching a transparent or translucent upper housing member to the upper surface of a lower housing member.

18. A method of making the sheet dispenser of claim 6, said method comprising:

incorporating one or more activatable devices into a housing of the sheet dispenser, wherein the one or more activatable devices are activated by movement of a stack of sheets within the housing.

19. A method ofmaking the sheet dispenser of claim 12, said method comprising:

applying a textured or roughened coating material onto an interior surface of a sheet dispenser housing in order to increase an amount of friction between a sheet being removed from the sheet dispenser and an interior surface of the housing.

20. A method of providing feedback to a user, said method comprising:

at least partially removing a first sheet from a stack of sheets within a sheet dispenser;

said feedback comprising (a) visual feedback of indicia positioned under the stack of sheets within a housing of the sheet dispenser and viewable upon movement of the slack of sheets within the housing; (b) visual feedback from a visual feedback-generating signal-receiving device within or outside of the housing; (c) audio feedback from an audio feedback-generating, signal-receiving device within or outside of the housing; (d) aromatic feedback (i) from within the housing or (ii) from an aromatic feedback-generating signal-receiving device within or outside of the housing; or (e) a combination thereof.

21. A sheet dispenser system comprising:

the sheet dispenser of claim 1; and at least one signal-receiving device.

22. The sheet dispenser system of claim 21, wherein the signal-receiving device comprises a speaker, a sound-generating device, a light, a gas burner, a gas log fireplace, a stopwatch, timer, an alarm clock, a vehicle ignition system, a room deodorizer, a stove an appliance, a personal computer, a calculator, a hand-held computer, an electronic hand-held organizer, an email-receiving device, or a cell phone.

* * * * *

UNITED STATES PATENT AND TRADEMARK OFFICE

CERTIFICATE OF CORRECTION

PATENT NO. : 6,837,395 B2 
DATED : January 4, 2005
INVENTOR(S) : Windorski, David C.

It is certified that error appears in the above-identified patent and that said Letters Patent is hereby corrected as shown below:

Title page,
Item [74], *Attorney, agent, or firm*, delete “Jones” and insert -- Jonas --, therefore;

Column 17,
Line 58, delete “ether” and insert -- other --, therefore;

Column 18,
Line 9, delete “shcets” and insert -- sheets --, therefore;
Line 21, delete “,” and insert -- ; --, therefore;
Line 31, delete “stank” and insert -- stack --, therefore;
Line 44, delete “crne” and insert -- one --, therefore;
Line 54, delete “mecbamcal” and insert -- mechanical --, therefore;
Line 57, delete “aetivatable” and insert -- activatable --, therefore;
Line 58, delete “stationazy” and insert -- stationary --, therefore;
Line 67, delete “18” and insert -- is --, therefore;

Column 19,
Line 30, delete “fcedback-generating” and insert -- feedback-generating --, therefore;

Column 20,
Line 5, delete “ofmaking” and insert -- of making --, therefore;
Line 20, delete “slack” and insert -- stack --, therefore;
Lines 21 and 26, after “feedback-generating” insert -- , --, therefore.

Signed and Sealed this

Twelfth Day of April, 2005

JON W. DUDAS
*Director of the United States Patent and Trademark Office*